United States Patent [19]

Carey, Jr.

[11] Patent Number: 5,121,889
[45] Date of Patent: Jun. 16, 1992

[54] ELECTRONIC FOOT CONTROLS

[75] Inventor: Edward H. Carey, Jr., Peoria, Ariz.

[73] Assignee: Grumman Aerospace Corporation, Bethpage, N.Y.

[21] Appl. No.: 695,913

[22] Filed: May 6, 1991

[51] Int. Cl.$^5$ .............................................. B64C 13/04
[52] U.S. Cl. .................................. 244/234; 244/236; 200/86.5; 338/153; 338/128; 114/144 R; 440/7
[58] Field of Search ............ 244/234, 235, 236, 237, 244/222; 74/512, 474, 471 XY, 560; 200/86.5; 440/7, 6; 114/144 R, 144 RE; 338/153, 108, 128, 129

[56] References Cited

U.S. PATENT DOCUMENTS

| | | | |
|---|---|---|---|
| 2,379,774 | 7/1945 | Wyer | 338/153 |
| 2,460,494 | 2/1949 | Esienberg et al. | 338/153 |
| 2,986,953 | 6/1961 | Armand et al. | 338/153 |
| 2,992,797 | 7/1961 | Visser | 244/235 |
| 3,833,782 | 9/1974 | Bartel | 338/153 |
| 4,120,387 | 10/1978 | Otteblad et al. | 74/512 |
| 4,237,752 | 12/1980 | Hildebrecht | 74/474 |
| 4,614,900 | 9/1986 | Young | 440/7 |

*Primary Examiner*—Galen Barefoot
*Attorney, Agent, or Firm*—Pollock, VandeSande & Priddy

[57] ABSTRACT

A six-way foot control device has a toe portion pivotally mounted to a heel portion so that two directions of angular toe displacement may be realized about a neutral position. The heel portion is itself pivotally mounted to permit two directions of sideways angular displacement about a corresponding second neutral point. Finally, the foot control is slidably mounted to permit two directions of linear displacement about a third neutral point. Each direction of displacement is detected by a transducer and may control another function of an aircraft or vehicle.

6 Claims, 1 Drawing Sheet

U.S. Patent
June 16, 1992
5,121,889
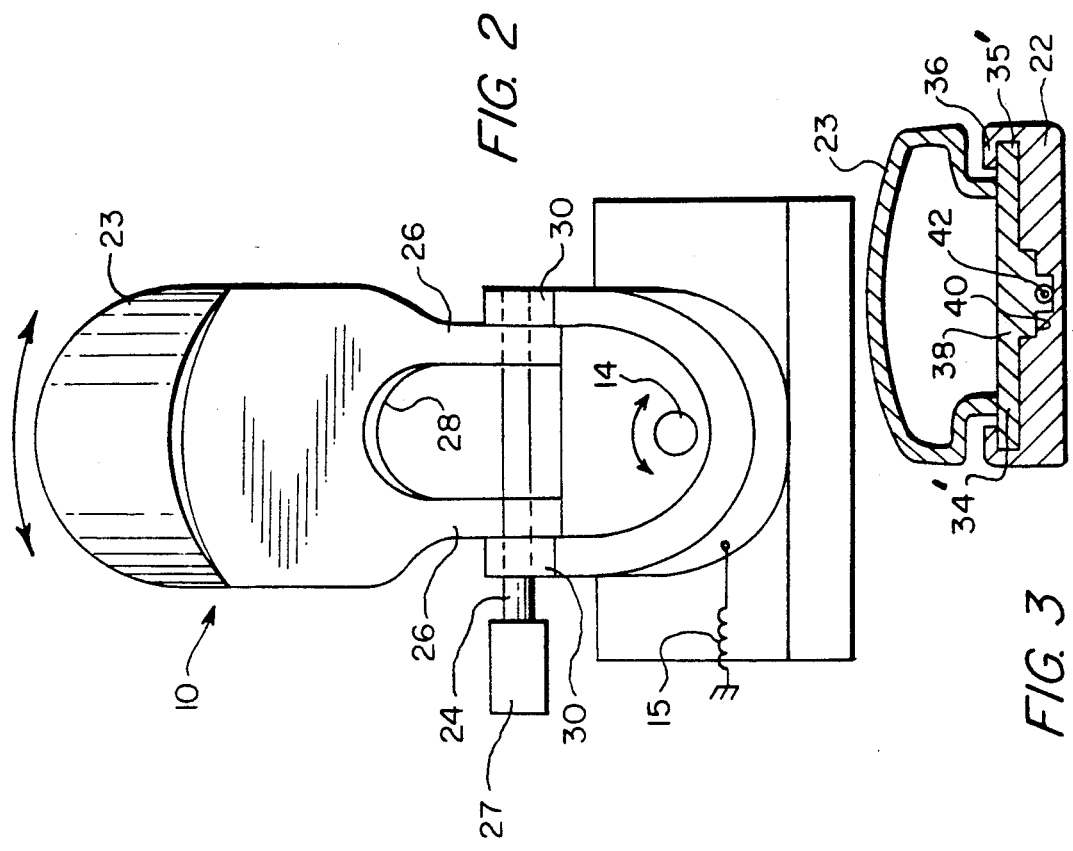
FIG. 2
FIG. 3
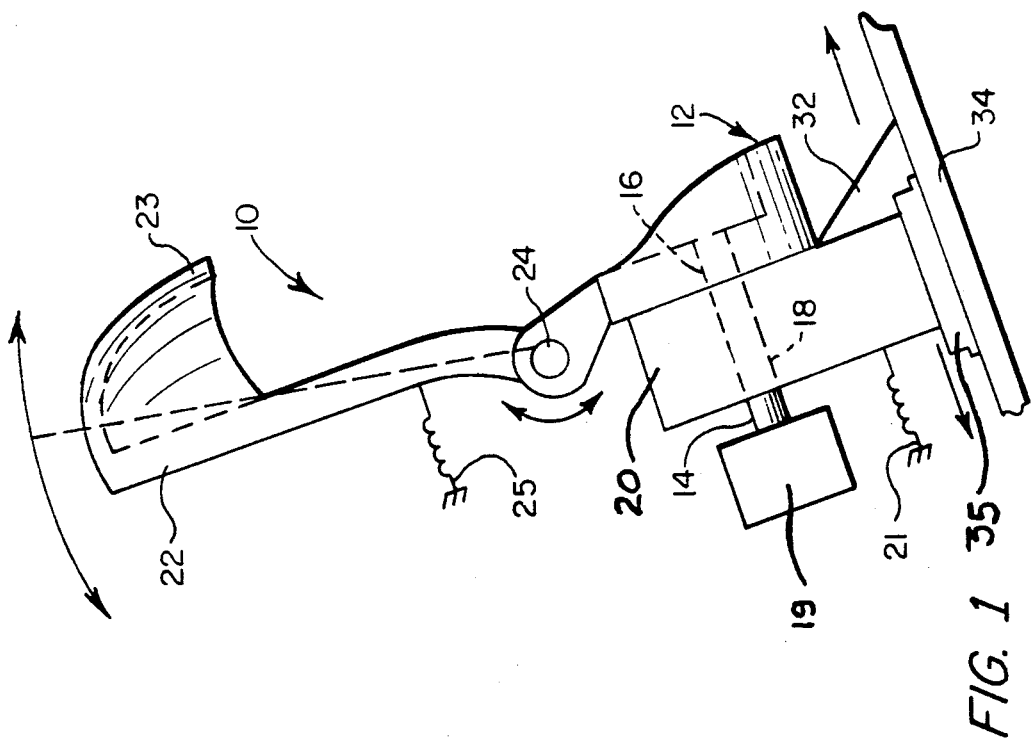
FIG. 1

ELECTRONIC FOOT CONTROLS

FIELD OF THE INVENTION

The present invention relates to vehicle controls, and more particularly to foot controls for flight or ground movement of an aircraft.

BACKGROUND OF THE INVENTION

To control the movement of aircraft on the ground and in the air requires manipulation of hand and foot controls. Foot controls are generally provided to displace control surfaces on an aircraft through intervening linkages which become a weight and space design factor. Further, these linkages present a maintenance and reliability problem. It would be desirable for pilots to have for their use compact foot controls which do not rely upon extensive linkage systems but instead input positional data to electronic servo systems which can then hydraulically or electrically control control surfaces of the aircraft.

BRIEF DESCRIPTION OF THE PRESENT INVENTION

The present invention relates to a compact foot control device which is capable of movement about neutral points on two distinct axes as well as bi-directionally along a linear direction thereby producing six-way movement of the foot pedal. This six-way movement can control six functions of the aircraft such as individual control surfaces, throttle and braking, just to mention a few. The number of functions can be extended by permitting the foot control, operating in a particular direction, to affect control surface displacement when the aircraft is airborne and gear steering when the aircraft has landed and the landing gear senses the weight of an aircraft bearing thereon. Accordingly, a wide range of control functions can be performed by the foot control of the present invention.

The present invention further has application for other types of vehicles, including vehicles for handicapped persons who do not have use of their arms. Still further, boats, heavy equipment construction equipment, and various types of wheeled vehicles are likely candidates for successful use of the present invention wherein foot controls are capable of controlling several different types of mechanical motion and pressure or flow regulation.

BRIEF DESCRIPTION OF THE FIGURES

The above-mentioned objects and advantages of the present invention will be more clearly understood when considered in conjunction with the accompanying drawings, in which:

FIG. 1 is a side elevational view of the present invention;

FIG. 2 is a front elevational view of the present invention;

FIG. 3 is a partial sectional view of a toe cup adjusting mechanism that may be optionally employed with the present invention.

DETAILED DESCRIPTION OF THE INVENTION

Reference numeral 10 generally indicates the foot control of the present invention. The structure of the foot control is seen to include a heel piece 12 for receiving the heel portion of an operator's shoe. Extending perpendicularly outwardly of the heel piece 12 is a shaft 14 which is received in a journal 18 formed in support block 20, the right illustrated end of shaft 14 being fixedly secured within a bore 16 formed in the heel piece 12. As shown in FIG. 2, the foot control pivots at its heel piece 12 about the shaft 14 and an angular position transducer 19, such as a shaft encoder, electronically detects angular displacement of the foot control to the left or to the right. Additional conventional electronic-hydraulic systems (not shown) convert the signals generated by the transducer to appropriate forces for displacing control surfaces or the like. As schematically illustrated in FIG. 2, an appropriate spring-loaded mechanism 15 may be used to bias the foot control in a normal neutral position.

A sole plate 22 is provided to support the sole portion of a user's shoe, a rear portion of the sole plate being pivotally mounted to the heel piece 12. In FIG. 2 a semioblong opening 28 is formed within a median rear portion of the sole plate 22 thereby creating two parallel spaced lugs 26 which serve as a clevis for the shaft 24. The outward ends 30 of the heel piece 12 are likewise formed as a clevis through which the shaft 24 passes. Referring to FIG. 1, the sole plate 22 pivots relative to the heel piece 12. A second angular position transducer 27 (FIG. 2) is connected to shaft 24 for measuring the angular displacement of the sole plate 22 relative to a neutral position. As schematically illustrated in FIG. 1, a spring 25 is secured to the sole plate 22 to bias the plate in a neutral position. Since the sole plate 22 can be moved in two directions relative to the sole plate neutral position, two sets of signals will be generated by the transducer 27 corresponding to the direction of sole plate displacement relative to the neutral position.

Thus far described the present invention can operate as a four-way foot control, two-function operation being possible with the pivotable sole plate and an additional two-way control being possible with the pivotable heel piece. It is possible to increase the capability of the present invention so that it becomes a six-way control device. This is accomplished by slidably mounting the support block 20 in a track 34 or alternatively on a rail. This is generally shown in FIG. 1. A wedge plate 32 is connected between a surface of the support block 20 and the top of track 34 for providing additional stability. As indicated in FIG. 1, the linear sliding connection between the foot control 10 is biased into a neutral position by a centering mechanism which is shown diagrammatically by a simple spring 21 connected between a fixed point and support block 20. It should be mentioned that each of the foot control position centering springs 15, 21, 25 which achieve a biased neutral position for the foot control may take the form of various conventional spring-detent mechanisms, as is well known to those having skill in the art.

In order to sense the linear displacement of the foot control relative to track 34, a conventional linear displacement transducer 35 is used. One form of such a transducer may be an electro-optic device well known to those of skill in the art. The transducer 35 senses linear displacement in opposite directions relative to a neutral point.

FIG. 3 illustrates a slidable spring-loaded structure for toe cup 23 which is slidably mounted relative to the sole plate 22. As shown in FIG. 3, the base 34' of movable toe cup 23 has overhanging lateral edges 35' retained by a similarly extending flange 36 of U-shaped cross section. A lower portion of the base 34′ has a step cross section, as indicated by reference numeral 38, which is adapted to slide within a similarly configured groove 40 in the sole plate 22. A spring 42 is connected at opposite ends thereof between the base 34′ and the sole plate 22 so as to bias the toe cup 23 downwardly against an inserted shoe after the shoe has been inserted into the toe cup 23 thus providing proper fit of an operator's shoe into the foot control 10.

In operation of the foot control described, one can realize six-way control as follows. Each of the shafts 14 and 24 is capable of effecting two directions of angular motion relative to a neutral point. Thus, each of these shafts may control separate functions, such as a steering function for aircraft control surfaces or throttle/braking functions for aircraft or vehicles. Displacement of the foot control relative to track 34 may occur in opposite linear directions, which allows separate function control in corresponding directions. By using left and right foot controls in accordance with the present invention, the number of controllable functions is effectively doubled. For advanced military aircraft, the present foot controls may be employed to control various functions, the following being provided by way of example: nose gear steering, rudder control, engine nozzle/thrust vectoring control throttle, and braking control, and engine nozzle/thrust reversal control.

It should be understood that the invention is not limited to the exact details of construction shown and described herein for obvious modifications will occur to persons skilled in the art.

I claim:

1. A foot control having four degrees of freedom and comprising:
    a base journal block for receiving a shaft connected at one end thereof to a heel piece of the foot control, the heel piece for supporting a shoe heel and being rotatable with respect to the block;
    means connected to the heel piece for biasing the heel piece in a neutral position, wherein sideways angular displacement of the foot control about the neutral position results in two degrees of freedom;
    a separate sole plate pivotally connected to the heel piece for supporting a shoe sole and allowing pivotal displacement of the sole plate relative to the heel piece;
    means connected to the sole plate for biasing it in a neutral position, wherein pivotal sole plate displacement about its neutral point results in two additional degrees of control;
    first transducer means connected to the heel piece shaft for converting shaft angular displacement to an electrical signal; and
    second transducer means connected to a pivotal connection between the sole plate and heel piece for converting pivotal displacement of the sole plate to an electrical signal.

2. The foot control device set forth in claim 1 together with a toe cup slidably mounted to the sole plate; and
    spring means connected between the toe cup and the sole plate for biasing the cup against an operator's shoe toe.

3. The device set forth in claim 1 wherein the pivotal connection of the sole plate to the heel piece comprises a shaft transversely received within a rear section of the sole plate and a front section of the heel piece.

4. A six-way foot control comprising:
    a base journal block for receiving a shaft connected at one end thereof to a heel piece of the foot control, the heel piece for supporting a shoe heel and being rotatable with respect to the block;
    means connected to the heel piece for biasing the heel piece in a neutral position, wherein sideways angular displacement of the foot control about the neutral position results in two degrees of control;
    means for slidingly mounting the block permitting to and fro linear movement of the foot control;
    means connected to the block for biasing it in a neutral position wherein linear displacement of the foot control in both directions, relative to the neutral point, results in an additional two degrees of control;
    a separate sole plate pivotally connected to the heel piece for supporting a shoe sole and allowing pivotal displacement of the sole plate relative to the heel piece;
    means connected to the sole plate for biasing it in a neutral position, wherein pivotal sole plate displacement about its neutral point results in two additional degrees of control;
    first transducer means connected to the heel piece shaft for converting shaft angular displacement to an electrical signal;
    second transducer means connected to a pivotal connection between the sole plate and heel piece for converting pivotal displacement of the sole plate to an electrical signal; and
    third transducer means located near the block for converting linear foot control displacement to an electrical signal.

5. The device set forth in claim 4 together with a toe cup slidably mounted to the sole plate; and
    spring means connected between the toe cup and the sole plate for biasing the cup against an operator's shoe toe.

6. The device set forth in claim 5 wherein the pivotal connection of the sole plate to the heel piece comprises a shaft transversely received within a rear section of the sole plate and a front section of the heel piece.

* * * * *